United States Patent [19]
Kawano et al.

[11] 3,725,472
[45] Apr. 3, 1973

[54] PROCESS FOR PREPARING α,β-UNSATURATED CARBOXYLIC ACIDS

[75] Inventors: Akira Kawano, Tsurugaoka; Kozo Sakakibara, Oicho; Iwao Abe, Iruma-gun; Takayuki Chonan, Saitama, all of Japan

[73] Assignee: Daicel Ltd., Osaka, Japan

[22] Filed: July 28, 1970

[21] Appl. No.: 59,002

[30] Foreign Application Priority Data

Aug. 5, 1969 Japan...................................44/6180

[52] U.S. Cl..............................260/530 N, 252/464
[51] Int. Cl............................C07c 51/26, C07c 57/04
[58] Field of Search........260/533 N, 530 N; 252/464

[56] References Cited

UNITED STATES PATENTS 3,365,482 1/1968 Koobiar............................252/464 X
3,397,154 4/1968 Talsma..............................252/464 X
3,408,392 10/1968 Yamagishi et al.................260/530 N
3,544,617 12/1970 Oga et al..........................252/464 X
3,565,829 2/1971 Friedrischen et al.................252/464

Primary Examiner—Henry R. Jiles
Assistant Examiner—Richard D. Kelly
Attorney—Woodhams, Blanchard and Flynn

[57] ABSTRACT

α,β-unsaturated carboxylic acid is prepared by oxidizing an α,β-unsaturated carbonyl compound in the vapor phase with a molecular oxygen-containing gas in the presence of a ternary catalyst of the formula:

$$Mo_a V_b Sb_c O_d$$

wherein $a$ is 12, $b$ is 1 to 25, $c$ is 0.1 to 10.0 and $d$ is 38.65 under the condition that the other elements are completely oxidized. The ternary catalyst is supported on a carrier of sintered metallic aluminum made by shaping into granules metallic aluminum powder having a particle size of 6 to 150 mesh and then sintering the granules at a temperature in the range of 600° C. to 660° C.

5 Claims, No Drawings

PROCESS FOR PREPARING α,β-UNSATURATED CARBOXYLIC ACIDS

BACKGROUND OF THE INVENTION

1. Field of the Invention

This invention relates to a process of catalytically preparing α,β-unsaturated carboxylic acids by the vapor-phase oxidation of the corresponding α,β-unsaturated carbonyl compounds.

2. Description of the Prior Art

Since α,β-carboxylic acids, particularly acrylic acid and methacrylic acid, have wide and import applications as the starting materials of various polymer products, numerour processes for preparing them have been proposed in prior art. The important ones among these prior art processes are all characterized by the use of various kinds of catalyst compositions for obtaining α,β-unsaturated carboxylic acids by the vapor-phase oxidation of the corresponding unsaturated carbonyl compounds. Almost all these processes aim at obtaining catalysts having longer catalyst lives, which catalysts are capable of providing higher conversions of α,β-unsaturated carbonyl compounds and higher selectivities to α,β-unsaturated carboxylic acids.

However, as both the starting materials and the desired end products in the process for preparing unsaturated carboxylic acids by the vapor-phase catalytic oxidation of α,β-unsaturated carbonyl compounds are easily polymerizable compounds, a considerably large amount of loss due to polymerization is unavoidable during the oxidation reaction process or the separation and purification process. Catalysts used in such processes usually have poor lives, as the compounds to be treated are polymerizable, and it is difficult to obtain the desired α,β-unsaturated carboxylic acids with high selectivities, since the reaction is carried out at high temperatures. For instance, according to Japanese Pat. Publication No. 6262/1966, a ternary small-particle catalyst of molybdenum, vanadium and phosphorus is employed for the oxidation reaction at 380° C., but the conversion of acrolein is 82 percent and the selectively of acrylic acid is about 79.5 percent. Also, in the example of Japanese Pat. Publication No. 9045/1968, a ternary catalyst consisting of molybdenum, vanadium and aluminum is employed to perform an oxidation reaction of acrolein at 300° C., but the conversion of acrolein is 97.3 percent and the selectivity of acrylic acid is 88.1 percent. This selectivity value is still unsatisfactory. Particularly, it is described in the specification of Japanese Pat. Publication No. 28712/1968 that, in the process which uses the catalyst disclosed in the above Japanese Pat. Publication No. 6262/1966, the catalyst composition shows the reaction results above described in the early stage of the reaction, but, after the reaction has proceeded for about 50 hours, the acrolein conversion value is reduced to less than 80 percent and the acrylic acid yield value is reduced to about 62–63 percent, respectively, and after 100 hours, these reaction results are reduced from the initial values by as much as 35 percent. A catalyst whose activity is lowered markedly and has a short life is very disadvantageous for industrial uses.

We have already proposed a molybdenum-antimony-vanadium-oxygen ternary catalyst which is commercially useful in a process for preparing α,β-unsaturated carboxylic acids by oxidation of α,β-unsaturated carbonyl compounds, in Japanese Pat. No. 496599 (U.S. Pat. No. 3,408,392). As the result of further studies on this type of catalyst, we have found that, with respect to the use of this type of catalyst for said catalytic oxidation reaction, not only the catalyst composition but also the kinds of the carriers supporting such catalyst are important factors governing the activity and other properties of the catalyst. According to our studies, a useful carrier adapted to the above-described molybdenum-antimony-vanadium-oxygen ternary catalyst has been developed, by which α,β-unsaturated carboxylic acids have been successfully obtained with excellent results.

Regarding carriers for similar oxidation catalysts, it has been proposed, in the above-mentioned Japanese Pat. Publication No. 6262/1966, to use a catalyst comprising a ternary composition consisting of molybdenum, vanadium and phosphorus carried on aluminum sponge for preparing α,β-carboxylic acids from α,β-unsaturated aldehydes. In Japanese Pat. Publication No. 9045/1968, it has been proposed to use a catalyst comprising a ternary composition consisting of molybdenum, vanadium and aluminum carried on aluminum sponge for the same purpose. However, in these publications, the process for producing the aluminum sponge to be used and its properties are not described in detail. In general, for producing metal sponges, there has been used a method in which a gas is dissolved in a molten metal and, upon cooling, the discharged gas produces a porous metal sponge. For instance, there have been employed a process wherein aluminum metal is melted at a temperature higher than about 660° C. and an inert gas, such as hydrogen, nitrogen and argon, is enclosed in the molten aluminum, followed by discharging the gas by an appropriate method on cooling to form an aluminum sponge and a process wherein an aluminum alloy is melted to form a sponge-like material. However, a very high level technique is required for obtaining a good and definitely shaped aluminum sponge with good reproducibility by these processes and, therefore, they are disadvantages as commercial processes. Furthermore, the results obtained using the above-described catalysts carried on aluminum sponges are not so good.

SUMMARY OF THE INVENTION

The present invention relates to a process for manufacturing α,β-unsaturated carboxylic acids with a high yield by the vapor-phase oxidation of α,β-unsaturated carbonyl compounds with a molecular oxygen-containing gas, characterized in that a catalyst composition represented by the following formula $Mo_aV_bSb_cO_d$ wherein, when $a$ represents 12, $b$ is 1–25; $c$ is 0.1–10.0; and $d$ is 38.65 (under the condition that the other elements are completely oxidized) and, more preferably, when $a$ represents 12, $b$ is 1–6 and $c$ is 0.1–4.0, supported by sintered aluminum pellets which have been prepared by sintering shaped granular metallic aluminum at a high temperature.

The aluminum pellet carrier which is employed to support the catalyst composition in the process of this invention can be produced very easily in a uniform shape and, also, the catalyst prepared by immersing in or coating the carrier with the catalyst composition not only shows a very high activity for a long time but also brings forth a remarkably better result compared with conventional catalysts. The ternary catalyst composition consisting of molybdenum, vanadium and antimony to be used in the process of the present invention may be employed by being supported by a carrier such as alumina and silica, but, when the catalyst composition is supported on an alumina carrier and is used for longer than 100 hours, the conversion of the starting material is observed to decrease from the initial value by 10 percent. On the other hand, according to the process of the present invention, it has been observed that the catalyst of the invention can be used for several hundred hours and the selectivity will be maintained at a high level of substantially more than 90 percent during this period.

The present invention will now be explained in detail. The catalyst carrier which is used in the process of the present invention consists of metallic aluminum pellets prepared by shaping aluminum metal powder into granules having a predetermined shape and sintering them. Simple metallic aluminum pellets cannot be used, since they are unsuitable for coating with or immersing in the catalyst composition and, furthermore, when the catalyst is used in the reaction for a long time, the catalyst composition peels off from the carrier to reduce the activity. In the present invention, a binding agent, such as stearic acid, is added to metallic aluminum powder having a particle size in the range of 6 to 150 mesh and, preferably, of 10 to 100 mesh (according to Japanese Industrial Standard) and these constituents are mixed well. Then the mixture is shaped into granules by an appropriate conventional granulating method. The kinds of binding agents and the shaping method may be optionally selected according to conventional granulating methods, and the shape of the produced pellets may be spherical, elliptical, columnar or cylindrical. Further, the size of the pellet is not critical and may also be selected to be of any suitable size.

The shaped pellets of aluminum metal are sintered at a temperature in the range from 600° C. to 660° C., which is almost the melting point of the aluminum metal, under atmospheric pressure to obtain the desired carrier. The properties of the sintered aluminum pellets are not yet fully understood, but, when a sintering temperature of lower than 600° C. is used, there cannot be produced pellets to which the catalyst composition can adhere firmly enough to be satisfactory for use as a carrier for the catalyst composition according to the invention. The sintering atmosphere is not critical and the carrier is sintered under a reduced pressure or in a stream of air, nitrogen, hydrogen or hydrocarbon gas.

The catalyst composition to be used is a compound or a mixture having the above-described composition and ratio, and, preferably, it is produced from the water-soluble salts of its component elements, such as the ammonium salts. In order to support the catalyst composition on the sintered aluminum pellets, a coating or immersing method which have been used for preparing a conventional catalyst is employed. The amount of the catalyst composition to be adhered to and carried on the carrier is preferably in the range from 10 percent to 50 percent by weight, based on the weight of the carrier. If the amount of the catalyst is less than 10 percent by weight, the catalyst is not effective and, if the amount of catalyst is more than 50 percent by weight, it is uneconomical. The catalyst thus obtained by adhering the catalyst composition to the carrier is preliminarily sintered at a temperature in the range of 300°–500°C., which is a common sintering temperature, and then it is suitable for use in the oxidation reaction.

As the reaction process for manufacturing $\alpha,\beta$-unsaturated carboxylic acids from $\alpha,\beta$-unsaturated carbonyl compounds by using the above-described novel catalyst according to the present invention, there may be effectively performed a known conventional process such as the one described in the specification of U.S. Pat. No. 3,408,392. That is to say, a catalyst is packed in a flow-type reaction tube, through which an $\alpha,\beta$-unsaturated carbonyl compound mixed with a diluent, such as steam and nitrogen, and a molecular oxygen-containing gas is passed and contacted with the catalyst. The amount of $\alpha,\beta$-unsaturated carbonyl compound in the reactant vapor may be varied over a wide range from 1 to 20 percent by volume, preferably from 2 to 15 percent by volume. Similarly, the oxygen concentration may vary over a wide range of 1 to 20 percent by volume, but particularly, when the catalyst of the present invention is used, it is effective to use oxygen in the amount of 1 to 10 mols, preferably 1 to 5 mols, per 1 mol of $\alpha,\beta$-unsaturated carbonyl compound in the reactant vapor.

In performing the reaction, the reaction system is preferably diluted by nitrogen, propane, butane, carbon monoxide, carbon dioxide or steam. Nitrogen or steam are particularly preferable and the concentration thereof is preferably in the range of 20 to 60 percent by weight. The oxidation reaction is preferably carried out at a temperature in the range of 250° to 450° C., and the contact time may be in the range of 0.5 to 30 seconds.

The following examples are given to illustrate the present invention and are not intended to be limiting. In the examples, % means mol %, unless otherwise specified.

EXAMPLE 1

Metal aluminum powder of 10 to 20 mesh size was well mixed with 3% by weight of stearic acid, and was shaped into pellets of 3 m/m$\phi$ × 3 m/mL by employing a compression ratio of 1.6 to 1.7 with a conventional granulating machine. Then the pellets were sintered at 650° C. for 3 hours in an electric furnace in a stream of air to obtain sintered aluminum pellets. 20.4 parts by weight of ammonium molybdate and 4.29 parts by weight of ammonium metavanadate were dissolved completely in 200 parts by volume of water on heating at 70° C., and then a solution of 1.44 parts by weight of antimony trioxide suspended in 16 parts of water was added and stirred sufficiently. The solution was gradually cooled, and at 30° C., 10 parts by volume of 28% aqueous ammonia were added. While being stirred, the solution was heated again to produce a dark violet complex and the whole solution became homogeneous. The obtained solution was sprayed onto 100 parts by weight of the above-described sintered aluminum pellets, which were heated, to cause the catalyst composition to adhere to the pellets. The pellets thus treated were dried at 100°C. for 3 hours, and then were calcined at 300°C. for 5 hours. Thus, there was obtained a catalyst suitable for acrolein oxidation. The obtained catalyst was packed in a conventional flow-type reaction tube, and a gas consisting of 5% by volume of acrolein, 7.5% by volume of oxygen, 40% by volume of steam and the balance nitrogen was flowed through the reaction tube for a period of 10 hours and was allowed to contact the above-described catalyst at 400°C. with an average contact time of 1.5 seconds, and subsequently the oxidation reaction was carried out continuously for a long time. During the initial stage of the reaction, the acrolein conversion was 95% and the yield of acrylic acid (the "yield" means the "one pass" yield, here and hereinafter) was 89%. After operating continuously for 760 hours under the same conditions, the conversion of acrolein reduced to 85% but the selectivity changed relatively little and the acrylic acid yield was 80%.

COMPARATIVE EXAMPLE

A catalyst prepared by adhering the same catalyst composition as used in Example 1, by immersion, on a spherical Alundum carrier particles of 3 m/m$\phi$ by a conventional process was used in the oxidation reaction of acrolein under the same conditions as in Example 1. At the initiation of the reaction at the reaction temperature of 350° C., the conversion of acrolein was 95% and the yield of acrylic acid was 82%, but, after only 100 hours passed, the conversion of acrolein and the yield of acrylic acid reduced to 82.3% and 73%, respectively, thereby showing a marked reduction of the catalyst activity.

EXAMPLES 2 TO 5

A catalyst was prepared by using as the carrier the sintered aluminum pellets produced in the same way as described in Example 1 except the composition of the catalyst composition was changed, and the oxidation of acrolein was performed with a conventional flow-type reaction tube at a reaction temperature of 350° C. The conditions were the same as used in Example 1, except that the starting material gas used in the reaction consisted of 3.8% by volume of acrolein, 5.6% by volume of oxygen, 34.0% by volume of nitrogen and the balance steam. The said starting material gas was allowed to contact catalysts of various compositions, and the following results were obtained.

| Example No. | Composition of catalyst | Acrolein conversion (%) | Acrylic acid (%) Selectivity | Yield |
|---|---|---|---|---|
| No. 2 | $Mo_{12}V_1Sb_1$ oxide | 93.8 | 95.1 | 89.2 |
| No. 3 | $Mo_{12}V_2Sb_1$ oxide | 89.4 | 94.7 | 84.6 |
| No. 4 | $Mo_{12}V_{3.8}Sb_1$ oxide | 98.1 | 95.3 | 93.5 |
| No. 5 | $Mo_{12}V_{3.8}Sb_2$ oxide | 98.5 | 95.0 | 93.5 |

EXAMPLE 6

Calcined aluminum pellets prepared by the same process as used in Example 1 were used as the carrier. 797.8 parts by weight of ammonium molybdate and 167.4 parts by weight of ammonium vanadate were dissolved in 5000 parts by volume of water with heating and, after adding 219.5 parts by weight of antimony trioxide, the mixture was heated under reflux till a dark violet complex was formed to make the solution homogeneous. The obtained solution was adhered to 5000 parts by weight of the above aluminum pellet carrier while keeping the temperature at 100° to 115° C. The subsequent drying and sintering conditions were the same as used in Example 1. It was found that the catalyst composition prepared by the above-described process consisted of $Mo_{12}V_{3.8}Sb_4$ oxide and the amount of the catalyst composition adhered to the carrier was 20% by weight, based on the weight of the carrier.

The obtained catalyst was packed in a reaction tube, and a starting material gas consisting of 6.0% acrolein, 9.0% oxygen, 24% steam and the balance nitrogen was allowed to react at 330° C. with an average contact time of 2.65 seconds continuously until a constant catalyst activity was observed. The constant activity at the said reaction temperature was obtained at about 170 hours after the reaction started. The constant activity condition showed a conversion of acrolein of 83.9% and a yield of acrylic acid of 75.0%. Then, the temperature was reduced to 315° C. and the variation of activity was examined for 4000 hours, but there was observed no substantial change. The conversion of acrolein was 81.6% and the yield of acrylic acid was 70%.

EXAMPLE 7

An oxidation reaction was performed using the same catalyst as used in Example 1, except that the starting material gas contained methacrolein instead of the acrolein used in Example 1. The composition of the starting gas mixture was 3.5% by volume of methacrolein, 24% by volume of air and 72.5% by volume of steam. Under the conditions of a reaction temperature of 350° C. and a contact time of 1.5 seconds, 89% methacrolein was converted and the yield of methacrylic acid was 83.4%. The selectivity was 93.7%.

EXAMPLES 8 to 11

A catalyst was prepared in the same way as in Example 1, except that the particle size of the aluminum powder (mesh by Japanese Industrial Standard sieve) was changed as listed below and pellets of 5 m/m$\phi$ × 2.5 m/mL were formed. The starting gas used in the reaction consisted of 3.8% acrolein, 5.6% oxygen, 34% nitrogen and the balance steam. An oxidation reaction of acrolein was performed at 350° C. with the contact time of 1.5 seconds to obtain the following results.

| Example No. | Particle size of aluminum (mesh, JIS) | Acrolein conversion (%) | Acrylic acid selectivity (%) | Acrylic acid Yield (%) |
|---|---|---|---|---|
| 8 | 10 – 35 | 97.4 | 96.8 | 94.3 |
| 9 | 45 – 85 | 91.9 | 93.2 | 85.4 |
| 10 | 85 – 115 | 82.4 | 94.0 | 77.4 |
| 11 | 45 – 160 | 73.1 | 95.5 | 69.1 |

The embodiments of the invention in which an exclusive property or privilege is claimed are defined as follows:

1. Improvement in a process for preparing $\alpha,\beta$-unsaturated carboxylic acid which comprises oxidizing an $\alpha,\beta$-unsaturated carbonyl compound in the vapor phase with a molecular oxygen-containing gas in the presence of a ternary catalyst having the chemical composition represented by the following formula:

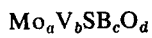

wherein $a$ is 12, $b$ is 1 to 25; $c$ is 0.1 to 10.0; $d$ is 38.65 under the condition that other elements are completely oxidized, the improvement in which said ternary catalyst is supported on a carrier of sintered granular aluminum metal obtained by shaping into granules aluminum metal powder having a particle size of 6 to 150 mesh and sintering said granules at a temperature in the range of 600° C. to 660° C.

2. A process as claimed in claim 1, wherein $b$ is 1 to 6; and $c$ is 0.1 to 4.0.

3. A process as claimed in claim 1, wherein the particle size of said aluminum powder is in the range of 10 to 100 mesh.

4. A process as claimed in claim 1, wherein the amount of said ternary catalyst supported on said carrier is in the range of 10 to 50% by weight, based on the weight of the carrier.

5. A process as claimed in claim 1, wherein the ternary catalyst supported on said carrier is calcined at a temperature in the range of 300°–500°C. before its use in the oxidation reaction.

* * * * *